United States Patent
Ermakov et al.

(10) Patent No.: US 11,248,904 B2
(45) Date of Patent: Feb. 15, 2022

(54) SYSTEMS AND METHODS FOR REAL TIME MEASUREMENT OF SURFACE CURVATURE AND THERMAL EXPANSION OF SMALL SAMPLES

(71) Applicant: Rutgers, The State University of New Jersey, New Brunswick, NJ (US)

(72) Inventors: Alexei Ermakov, Piscataway, NJ (US); Xiuyan Li, New Brunswick, NJ (US); Eric Garfunkel, East Brunswick, NJ (US); Leonard C. Feldman, New Brunswick, NJ (US); Torgny Gustafsson, Narberth, PA (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 102 days.

(21) Appl. No.: 16/499,588

(22) PCT Filed: Mar. 26, 2018

(86) PCT No.: PCT/US2018/024266
§ 371 (c)(1),
(2) Date: Sep. 30, 2019

(87) PCT Pub. No.: WO2018/183153
PCT Pub. Date: Oct. 4, 2018

(65) Prior Publication Data
US 2021/0164777 A1 Jun. 3, 2021

Related U.S. Application Data

(60) Provisional application No. 62/478,119, filed on Mar. 29, 2017.

(51) Int. Cl.
*G01B 11/24* (2006.01)
*G01B 11/255* (2006.01)
*G06T 7/521* (2017.01)

(52) U.S. Cl.
CPC ........ *G01B 11/255* (2013.01); *G01B 11/2441* (2013.01); *G06T 7/521* (2017.01); *G06T 2207/30108* (2013.01)

(58) Field of Classification Search
CPC ... G01B 11/255; G01B 11/2441; G06T 7/521; G06T 2207/30108; G01M 11/0257; G01M 11/0242; G01M 11/0235
(Continued)

(56) References Cited

U.S. PATENT DOCUMENTS 4,275,964 A * 6/1981 Vassiliadis ......... G01M 11/0235
356/125
4,435,079 A * 3/1984 Hennick ............ G01M 11/0228
250/201.2
(Continued)

FOREIGN PATENT DOCUMENTS

| CN | 101355046 A | 1/2009 |
| JP | H08501885 A | 2/1996 |

(Continued)

OTHER PUBLICATIONS

Jou, et al: "Coating Thickness Effect on the Orientation and Thermal Expansion Coefficient of Polyimide Films", Polymer, 1992, vol. 33, No. 5, pp. 967-974.

*Primary Examiner* — Isiaka O Akanbi
(74) *Attorney, Agent, or Firm* — Fox Rothschild LLP

(57) ABSTRACT

Systems and methods for measuring a curvature radius of a sample. The methods comprise: emitting a light beam from a laser source in a direction towards a beam expander; expanding a size of the light beam emitted from the laser source to create a broad laser beam; reflecting the broad laser
(Continued)

beam off of a curved surface of the sample; creating a plurality of non-parallel laser beams by passing the reflected broad laser beam through a grating mask or a biprism; using the plurality of non-parallel laser beams to create an interference pattern at a camera image sensor; capturing a first image by the camera image sensor; and processing the first image by an image processing device to determine the curvature radius of the sample.

20 Claims, 15 Drawing Sheets

(58) Field of Classification Search
USPC .............. 356/124, 126, 611, 445, 625, 612
See application file for complete search history.

(56) References Cited

U.S. PATENT DOCUMENTS

| | | | |
|---|---|---|---|
| 4,599,907 A | 7/1986 | Kraus et al. | |
| 4,601,575 A * | 7/1986 | Tamaki | G01M 11/0235 356/124 |
| 4,625,565 A | 12/1986 | Wada et al. | |
| 4,653,855 A * | 3/1987 | Bimbach | A61B 5/0059 324/310 |
| 5,301,004 A * | 4/1994 | Percival | G01M 11/0235 356/125 |
| 5,633,718 A | 5/1997 | Manning | |
| 5,719,669 A * | 2/1998 | Ross, III | G01B 11/255 356/124 |
| 5,760,889 A | 6/1998 | Manning | |
| 5,912,738 A | 6/1999 | Chason et al. | |
| 5,986,807 A * | 11/1999 | Fork | G02B 5/1876 359/566 |
| 6,212,958 B1 | 4/2001 | Conley | |
| 7,391,523 B1 | 6/2008 | Taylor, II et al. | |
| 2003/0098704 A1 | 5/2003 | Du-Nour et al. | |
| 2003/0160969 A1* | 8/2003 | Endo | G01B 11/2441 356/520 |
| 2004/0179190 A1* | 9/2004 | Miyashita | G03F 7/706 356/124 |
| 2008/0111987 A1 | 5/2008 | Akashika et al. | |
| 2008/0151256 A1* | 6/2008 | Kikawa | G01B 9/02089 356/496 |
| 2011/0265578 A1 | 11/2011 | Johnson et al. | |
| 2013/0054192 A1* | 2/2013 | Vankerkhove | G01M 11/005 702/167 |
| 2014/0253907 A1* | 9/2014 | Ignatovich | G01M 11/0285 356/73 |
| 2014/0368812 A1* | 12/2014 | Humphry | G01M 11/0235 356/124 |
| 2016/0252392 A1* | 9/2016 | Tavassoly | G01J 9/0246 356/521 |
| 2016/0268173 A1 | 9/2016 | Broadway | |
| 2017/0162456 A1 | 6/2017 | Owen | |

FOREIGN PATENT DOCUMENTS

| | | |
|---|---|---|
| JP | 2000009553 A | 1/2000 |
| JP | 4164261 B2 | 10/2008 |
| WO | 0173376 A1 | 10/2001 |

* cited by examiner

SYSTEMS AND METHODS FOR REAL TIME MEASUREMENT OF SURFACE CURVATURE AND THERMAL EXPANSION OF SMALL SAMPLES

CROSS-REFERENCE TO RELATED APPLICATIONS

The present application claims the benefit of U.S. Provisional Patent Application Ser. No. 62/478,119 filed on Mar. 29, 2017. This application is incorporated in its entirety by reference herein.

BACKGROUND

Statement of the Technical Field

The present disclosure generally concerns thin film stress measurement. More particularly, the present solution relates to implementing systems and methods for real time measurement of a surface curvature and thermal expansion of samples (even as small as 5 mm×5 mm).

Description of the Related Art

The measurement of stress in thin films is significant for commercial and scientific purposes due to its critical role for film fabrication and application. It is commonly accomplished by determining the curvature radii of samples and stress calculation using Stoney's Mathematical Equation (1).

$$\sigma_f = \left(\frac{E}{1-v}\right)_s \frac{t_s^2}{6t_f}\left(\frac{1}{R}-\frac{1}{R_0}\right) \quad (1)$$

where $\sigma_f$ is stress in the thin film, E is Young's modulus, $v$ is Poisson's coefficient of a substrate, $t_s$ is thickness of a substrate, $t_f$ is a thickness of a thin film, $R_0$ is the substrate curvature before stress introduction, and R is the substrate curvature after stress introduction. Measurement of R and $R_0$ (in cases where the starting surface is not flat) for a known thickness yields the stress in the film.

Several approaches have been used for the measurement of curvature radius R, such as laser beam deflection, laser interference, and other optical methods. At the most basic level, R of curvature is measured by detecting the deviation of two parallel reflected laser beams from the curved surface and using simple geometry defined by the following Mathematical Equation (2).

$$R = \frac{2d_0 L}{\Delta d} = \frac{d_0}{\delta} \quad (2)$$

where $d_0$ is a distance between two laser beams 102, 104 reflected from a sample surface 106 and applied to the detector 108, $\Delta d$ is the difference between the distance $d_0$ and the distance d between the two reflected laser beams 110, 112 resulting from the deflection of the laser beams 102, 104, L is a distance between a detector 108 and the sample surface 106, and $\delta$ is the laser beams' deflection angle (as schematically shown in FIG. 1). A few improved designs based on this principal with more complicated laser path/elements were presented as in U.S. Pat. Nos. 5,633,718A, 5,760,889A, 5,912,738A and 7,391,523B1. Accuracy improvements in those designs were achieved through the use of more than two (2) laser beams (multi beam methods) and the averaging of results from each pair of the beams. However, the number of beams which can fit into a sample area is limited by the diffraction spreading of thin beams. A typical apparatus can use no more than twelve (12) beams. An apparatus based on a Fizeau principle has also been described in U.S. Pat. No. 8,154,733B2.

For measurement of relatively large R (>50 m) which is the result of the common stress in thin film (~$10^8$ Pa), the following are required: (1) a larger distance between the detector and sample surface L; and (2) a larger sample size $d_0$. Concerning the apparatus set up, the most current commercial and patented (U.S. Pat. No. 6,608,689B1) techniques always require a sample with a size larger than a 50 mm diameter. However, for laboratory research, most thin film deposition and characterization apparatus is designed for small samples. Those contradictory requirements make stress measurements on a laboratory research samples difficult. Although one technique which is available commercially (k-space MOS, U.S. Pat. No. 7,391,523B1) has the capability to measure the curvature of small samples. This technique's optical design is complicated and the measurement accuracy is not sufficient. Moreover, in many cases, film growth and treatment involves high temperature processing at temperatures near or above 1000° C. and the need for stress evaluation at these high temperatures. Existing stress/curvature measurement techniques are only capable of operating at temperatures up to 500° C.

SUMMARY

The present disclosure generally concerns systems and methods for measuring a curvature radius of a sample. The methods comprise: emitting a light beam from a laser source in a direction towards a beam expander; expanding a size of the light beam emitted from the laser source to create a broad laser beam; reflecting the broad laser beam off of a curved surface of the sample; creating a plurality of non-parallel laser beams by passing the reflected broad laser beam through a grating mask or a biprism; using the plurality of non-parallel laser beams to create an interference pattern at a camera image sensor; capturing a first image by the camera image sensor; and processing the first image by an image processing device to determine the curvature radius of the sample. The curvature radius can be used to compute a measurement of stress in the sample.

The curvature radius is determined by: performing operations by the image processing device to determine a value a based on contents of the first image and contents of a second image produced by light reflected off of a flat surface or a curved surface prior to a stress inducing treatment; determining a laser beam divergence value using the value a; and using the laser beam divergence value to compute the curvature radius of the sample.

In some scenarios, the value of a is determined based on positions of bright features contained in the first image and the second image. More particularly, the value a is determined by: extracting a first center position for each bright feature contained in the first image and a second center position for each bright feature contained in the second image; plotting points on a two dimensional graph for each said first center position respectively as a function of each said second center position; and determining a slope of a linear line defined by the points.

In those or other scenarios, the value of a is determined based on spatial frequency changes of bright features contained in the first image and the second image. The value a is determined by: determining a first frequency of a sinusoidal signal generated using brightness values of the bright features contained in the first image; and determining a ratio of the first frequency to a second frequency of a sinusoidal signal generated using brightness values of the bright features contained in the second image.

In those or other scenarios, the grating mask comprises periodic holes and/or periodic lines. The sample may be located inside of a high-temperature furnace.

BRIEF DESCRIPTION OF THE DRAWINGS

Embodiments will be described with reference to the following drawing figures, in which like numerals represent like items throughout the figures.

FIG. 3 shows the most typical case when the radius is much larger than the distance between the mask and the sample and an assumption can be made that Z=0.

FIG. 7 provides an illustration showing two methods to extract the laser divergence using image processing. In the first method, the position of each feature (e.g., bright spot or line) is extracted. By plotting the position of each feature (e.g., bright spot or line) from a curved surface as function of that from a flat surface, the slope of linear fitting a is calculated. In the second method, the spatial frequency of the bright features (e.g., spots or lines) is calculated using a Fast Fourier Transform ("FFT") procedure. The ratio of frequency from the flat surface to that from the curved surface gives the value of a.

DETAILED DESCRIPTION

Figure 1:
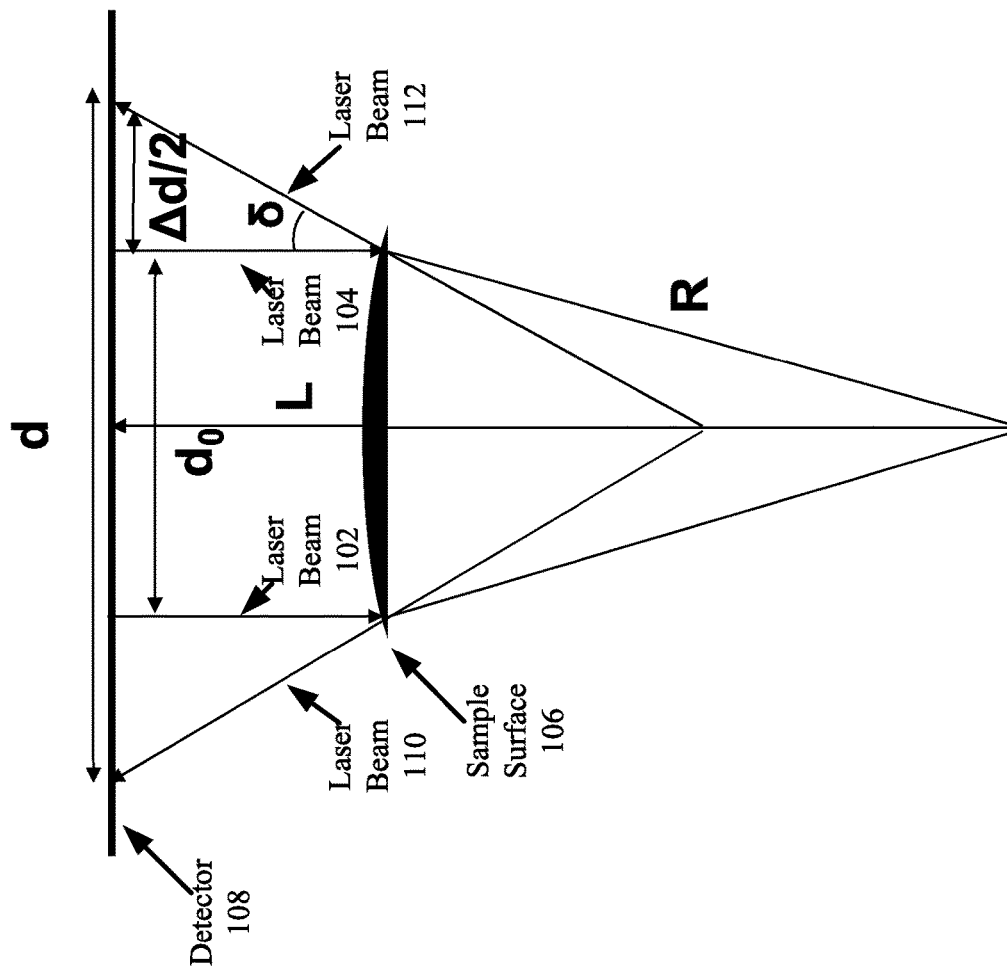
FIG. 1 is an illustration that it useful for understanding how a radius of a curvature is measured in accordance with conventional solutions.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present document generally concerns systems and methods for curvature measurement with high resolution of small samples both at room temperature and during high temperature processing. The present solution enables the measurement of the thermal expansion of transparent samples.

The present solution is capable of performing curvature measurement with high resolution ($\delta$ down to $4\times10^{-6}$) of small samples (as small as 5 mm×5 mm) by making use of interference and diffraction effects of a reflected laser beam, combined with novel image processing algorithms. The measurement can be performed at room temperature (ex-situ measurement) or during high temperature processing (in-situ/real-time measurement).

Each implementing system includes a laser source, a beam expander, a sample holder, a mask, a Charge Coupled Device ("CCD") camera, and image processing software. An expanded laser beam with a diameter of six millimeters (6 mm), reflected from the sample surface, interacts with a two dimensional (2-d) or one dimensional (1-d) diffraction grating mask so as to form multiple non-parallel laser beams. The laser beams form an interference pattern at a CCD camera sensor located at a specific distance from the 2-d or 1-d diffraction grating mask. Using image analysis, a small divergence of a reflected laser beam is determined accurately from interference patterns. The curvature of the sample surface is also calculated. This implementing system has been tested with $SiO_2/Si$ and $SiO_2/SiC$ samples.

The implementing system also allows detecting the interference of reflected laser beams from two sides of a transparent sample, which enables measurement of thermal expansion during heating or cooling.

Figure 2A:
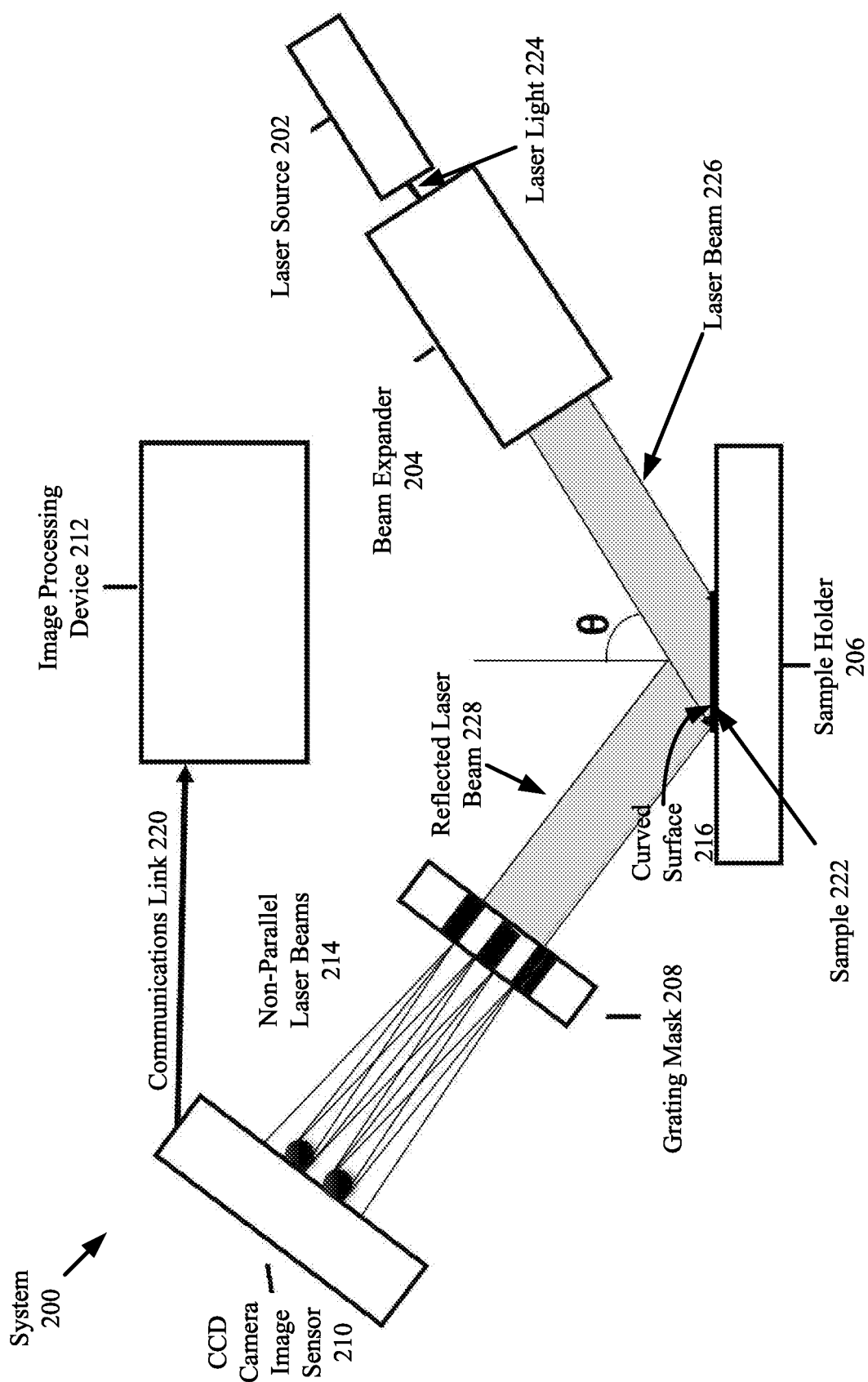
FIGS. 2A-2B (collectively referred to herein as "FIG. 2") provide a simplified schematic diagram of an illustrative system for an ex-situ measurement at room temperature.

Referring now to FIG. 2A, there is provided a diagram of an illustrative system 200. System 200 is generally configured to perform a curvature measurement with high resolution of small samples both at room temperature and during high temperature processing. System 200 comprises a laser source 202, a beam expander 204, a sample holder 206, a grating mask 208, a CCD camera image sensor 210, and an image processing device 212. Each of the listed components 202-210 is well known in the art, and therefore will not be described herein. Any known or to be known laser source, beam expander, sample holder, grating mask, and/or CCD camera image sensor can be used herein without limitation.

Figure 2B:
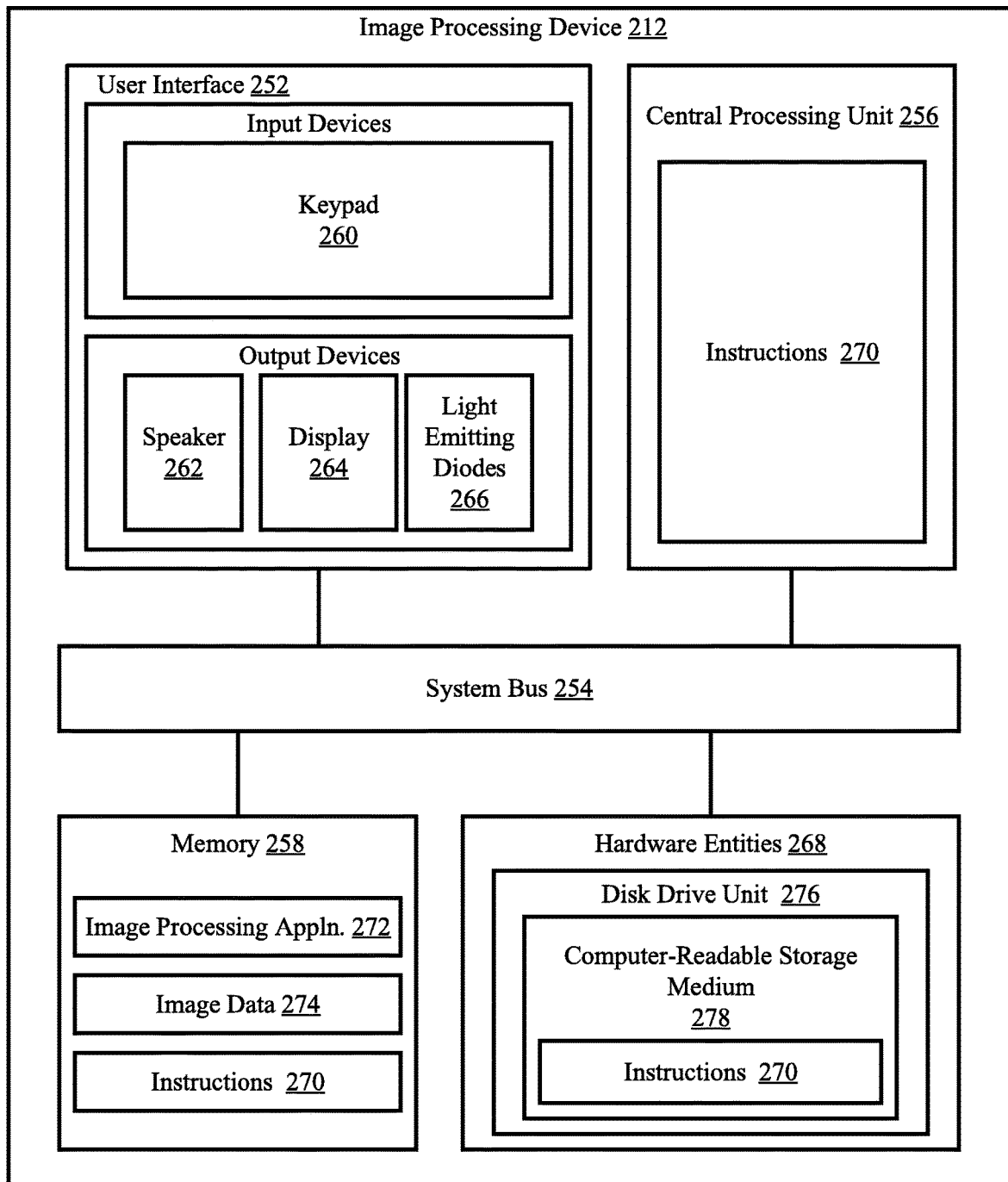

The laser source 202 is generally configured to emit light through a process of optical amplification based on a stimulated emission of electromagnetic radiation. The beam expander 204 is generally configured to expand the size of a collimated beam of light. The sample holder 206 is generally configured to structurally support and hold a sample 222 (e.g., an $SiO_2/Si$ sample and an $SiO_2/SiC$ sample). The grating mask 208 comprises a 1-d or 2-d diffraction grating with a periodic structure that splits and diffracts light into several beams traveling in different directions. The CCD camera image sensor 210 is generally configured to generate sense data for an image produced by light reflected from a surface, and provide the sense data to the image processing device 212 via communications link 220. The image processing device 212 can include, but is not limited to, a desktop computer, a personal computer, a general purpose computer, a laptop computer, and/or a smart device. A more detailed block diagram of the image processing device 212 is provided in FIG. 2B. FIG. 2B is described in detail below.

Figure 3:
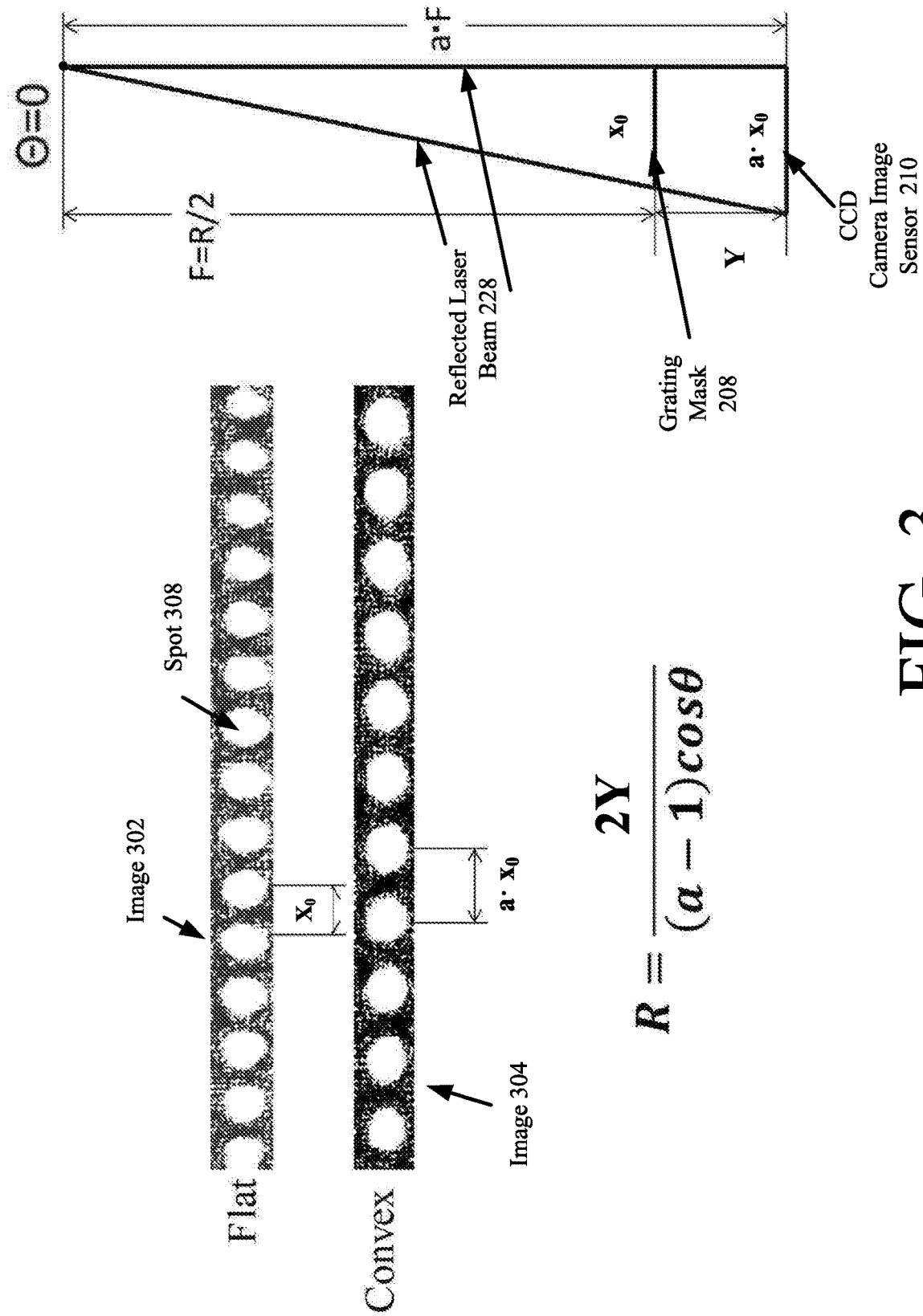
FIG. 3 provides an illustration that is useful for understanding how an image is processed and a curvature is calculated. Through comparing an image of an interference pattern created with a convex surface with that from a flat one, a small change in divergence of a reflected laser beam can be extracted and the large curvature radius can be calculated.

During operation, laser light 224 from the laser source 202 is expanded to a parallel broad laser beam 226 (e.g., a beam with a diameter of six millimeters (6 mm)) through the beam expander 204. The parallel broad laser beam 226 is reflected from a surface of the sample 222 structurally supported by the sample holder 206 with an incidence angle of $\theta°$. The reflected laser beam 228 then passes through the grating mask 208 forming several non-parallel laser beams 214. The non-parallel laser beams 214 form an interference pattern image at the CCD camera image sensor 210. The CCD camera image sensor 210 generates sensor data for a first image 304 produced by light reflected from a curved surface 216. Using image processing software running on the image processing device 212, the first image 304 associated with the curved surface 216 is compared with a previously acquired second image 302 associated with the flat surface or the curved surface prior to a stress inducing treatment. A laser beam divergence is determined based on the results of the comparison. The manner in which the value of a is determined is described in detail below. At this time, it should be understood that the quantity a−1 is defined by the following Mathematical Equation (3).

$$a - 1 = \frac{\Delta x}{x_0} \quad (3)$$

where $x_0$ is a distance between two bright spots 308 at the grating mask 208 or at the distance Y from the grating mask and obtained using the flat surface, and $\Delta x$ is the difference between the distance $x_0$ and a distance $a \cdot x_0$ between the two bright spots to the CCD camera image sensor 210 at the distance Y from the grating mask (as shown in FIG. 3). Next, the quantity a−1 is used to compute the curvature radius R of the sample 222. In this regard, the above provided Mathematical Equation (2) is rewritten as the following Mathematical Equation (4).

$$R = \frac{2Y}{(\alpha - 1)\cos\theta} - \frac{2Z}{\cos\theta} \quad (4)$$

where Y is the distance between the grating mask 208 and the CCD camera image sensor 210, and Z is the distance between the grating mask 208 and the curved surface 216. FIG. 3 provides an illustration that is useful for understanding this process.

A multi-laser-beam method has been described in U.S. Pat. Nos. 7,391,523B1 and 5,912,738A. In these patents, the parallel multi-laser beams are obtained using an optical device etalon. In addition, diffraction and interference effects among the parallel multi-laser beams are undesirable because they limit minimum spot size, degrade image quality and must be avoided. Thus, the diameter of each parallel multi-laser beam is required to be large enough to minimize the diffraction effects, and therefore the number of parallel multi-laser beams is limited.

Figure 4:
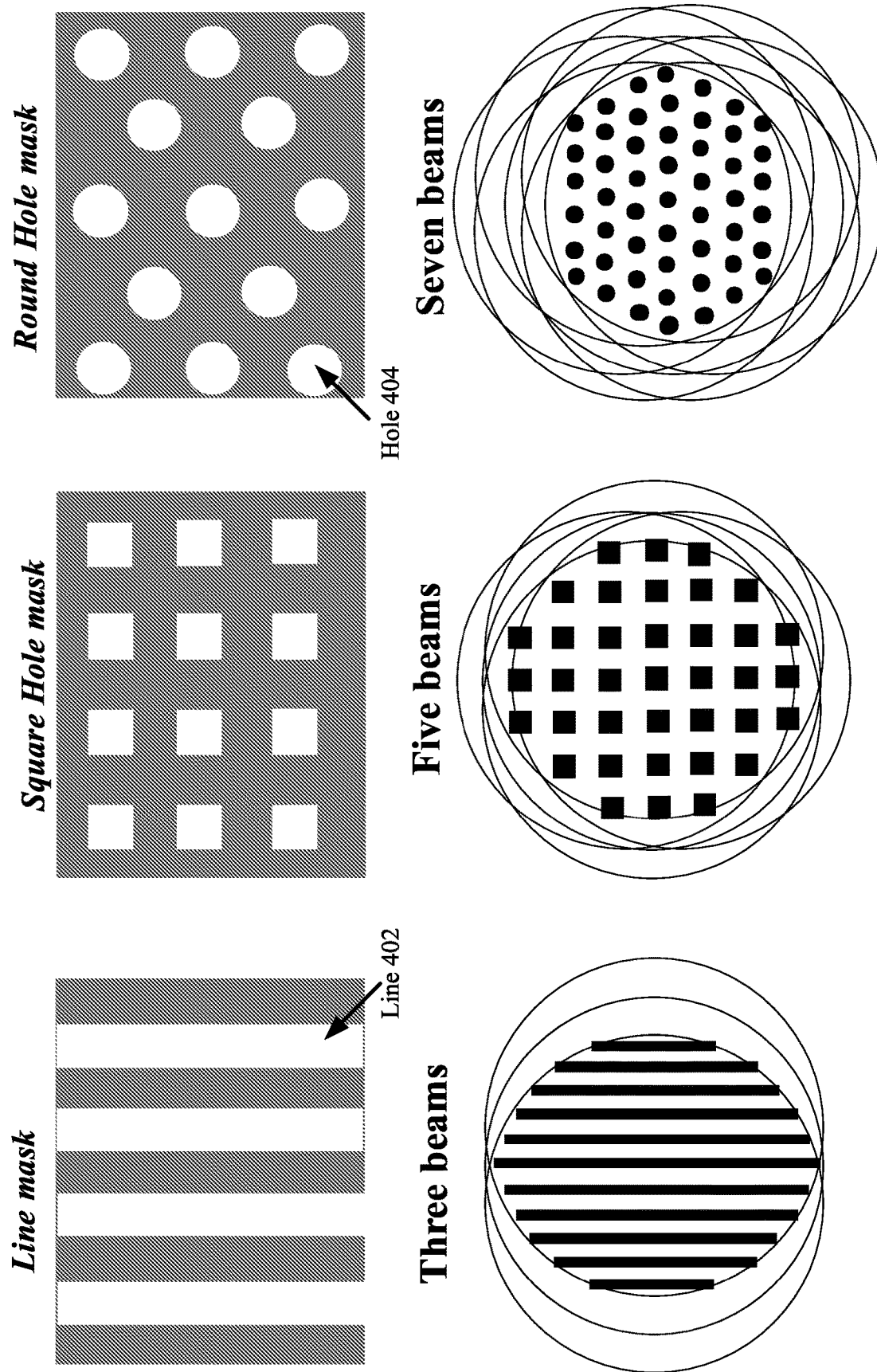
FIG. 4 provides illustrations showing three types of 1-d and 2-d grating masks and the diffraction effects of masks creating several non-parallel laser beams which form interference patterns.
Figure 5:
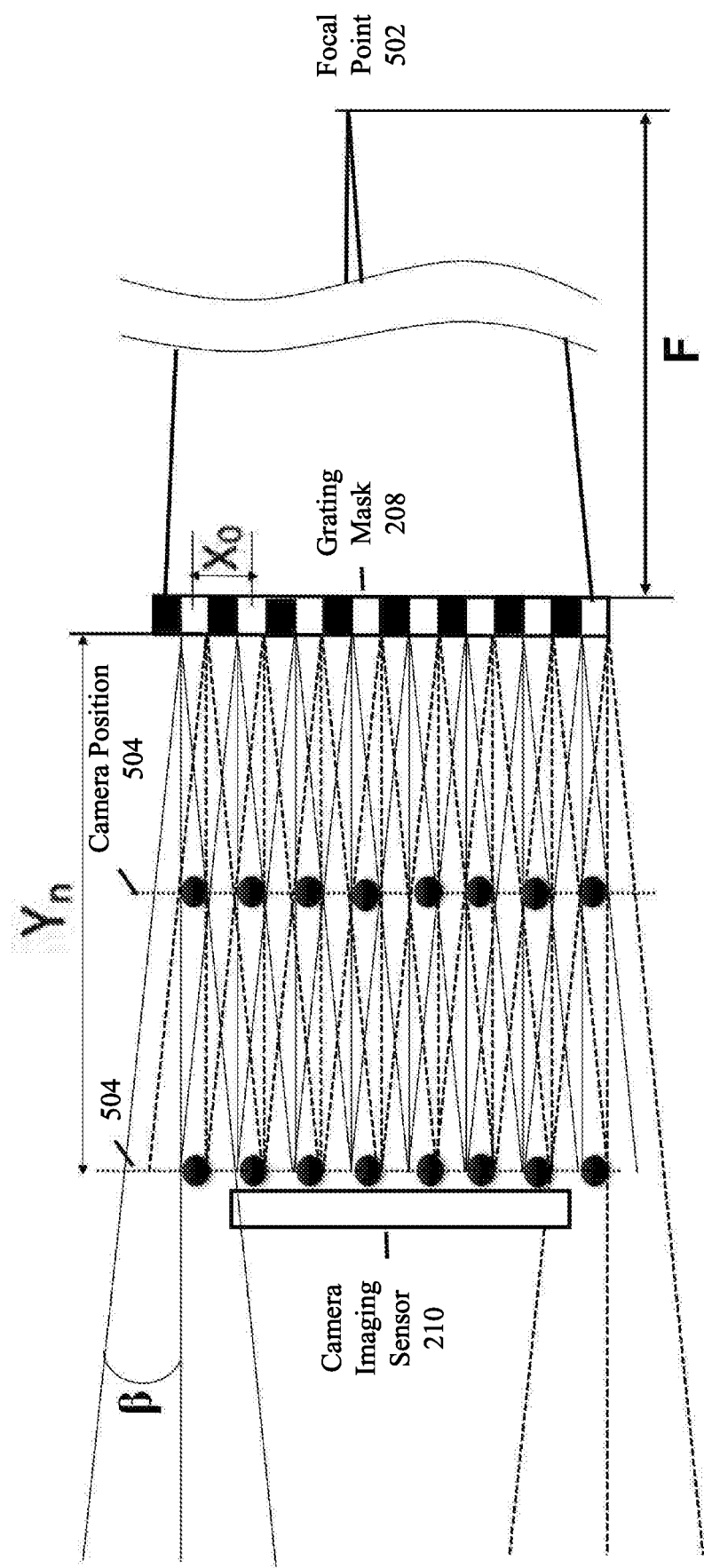
FIG. 5 provides an illustration that is useful for understanding how interference patterns of diffracted laser beams form in implementing the present solution. An expanded laser beam after reflection from the sample surface passes through a mask. Diffracted laser beams interfere with each other and create repeated images of the mask at periodic specific distances where an image is acquired. For a curved surface, the reflected beam can be treated as the diverging beam coming from a focal point at a distance F.

In the present solution, unlike the conventional technology of U.S. Pat. Nos. 7,391,523B1 and 5,912,738A, several non-parallel beams 214 are produced by means of diffraction using a grating mask 208 instead of an optical etalon device, and the pattern is formed by interference effects among the non-parallel laser beams 214. This way, the size of the spots 308 in the images 302, 304 can be much smaller, and the number of spots can be much larger than in the conventional methods. As illustrated in FIG. 4, the grating mask 208 can be a 1-d or 2-d grating. The dimensions of diffraction can be controlled by different arrays of holes 404 or lines 402. The laser beam 228 is split into several beams 214 as described by a diffraction grating defined by the following Mathematical Equation (5).

$$\beta = \sin^{-1}\left(\frac{m\lambda}{x}\right) \quad (5)$$

where β is the angle between the diffracted beam and the grating's normal vector, x is the distance between neighboring lines or holes in the grating mask, λ is a laser wavelength, and m is an integer representing a propagation mode of interest. Here, m=0, +1, −1 is considered. Note that the split laser beams 214 form repeating interference images at specific periodic distances from the grating mask 208 in accordance with Mathematical Equation (6), as shown in FIG. 5.

$$Y_n = \frac{nx}{\left(\frac{m\lambda}{x}\right) - \left(\frac{mnx}{F}\right)} \quad (6)$$

where F is a laser beam focal distance and n is an integer, n>0. Therefore, the CCD camera image sensor 210 is set near the specific position 504 with a distance $Y_n$ from the grating mask 208, which provides sharpest interference pattern. Here, F includes both diverging effects from the sample surface 222 and from the laser source 202.

Figure 7:
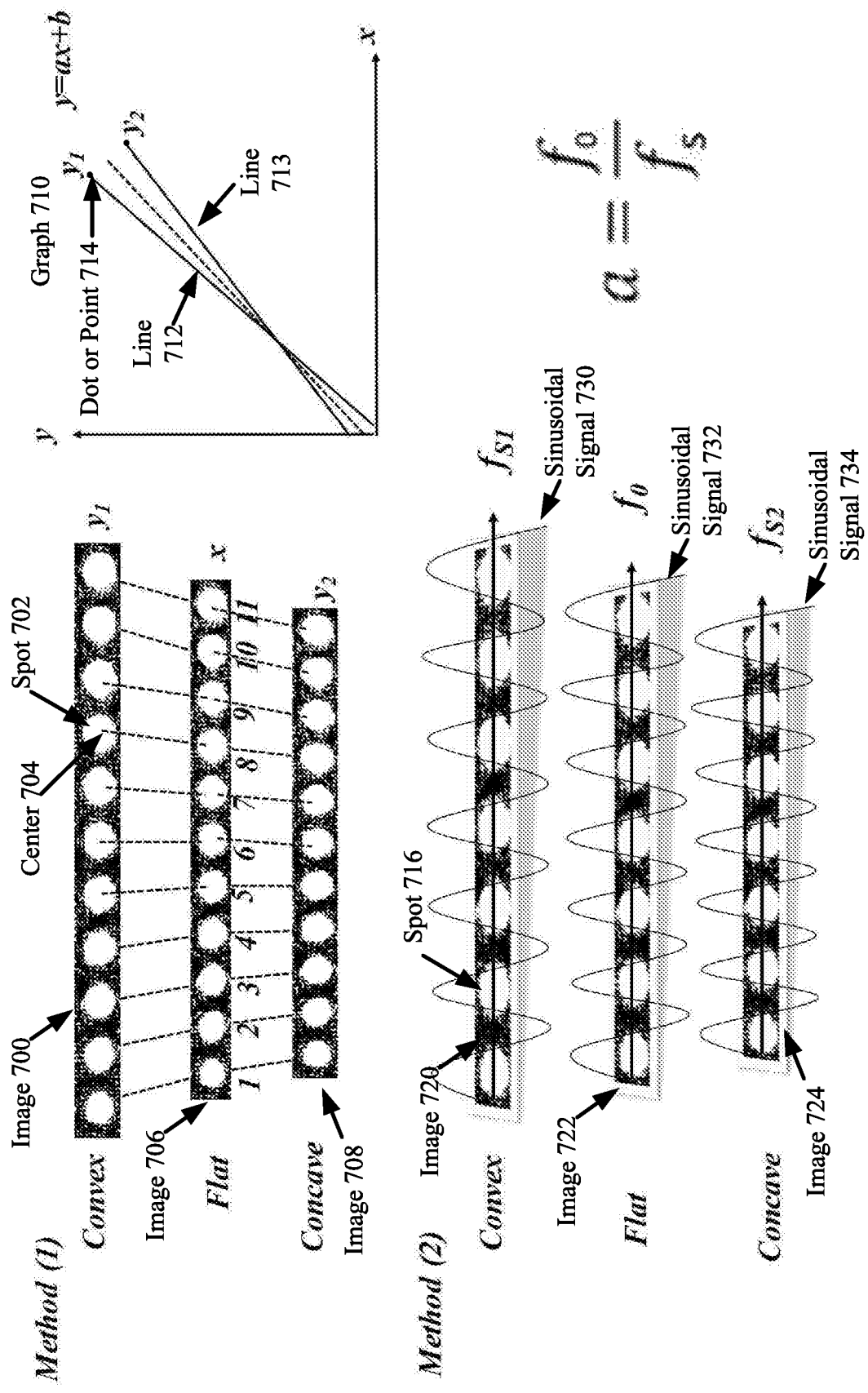

For obtaining the value of a, one of the following two methods is used at any given time by the image processing device 212. These two methods will now be described in relation to FIG. 7. In the first method (1), the center position 704 of each bright spot/line 702 is extracted via parabolic fitting of the brightness values. Parabolic fitting techniques are well known in the art, and therefore will not be described herein in detail. Any known or to be known parabolic fitting technique can be used herein without limitation. For example, in some scenarios, the parabolic fitting process generally involves: fitting brightness values to a parabola; and using a parabolic function to determine a location of a maximum brightness value in a given area to establish a centroid of the laser intensity. This process determines the precise value of $x_0$ and $a \cdot x_0$, which defined a y-axis value for a dot (or point) position on a two dimensional graph 710. This parabolic fitting process is repeated for a corresponding bright spot/line for the image 706 associated with a flat surface to obtain another values for $x_0$ and $a \cdot x_0$, which define an x-axis value for the dot position in the two dimensional graph 710. A dot or point is then plotted on the two dimensional graph 710 for the center position 704 of each bright spot 702 contained in a given surface image 700 or 708 as a function of that from a flat surface image 706, i.e., using the determined y-axis and x-axis values. The result of the plotting operations is a linear line 712 or 713. The slope of the linear line 712 or 713 gives the value of a. The linear line 712 or 713 is defined by the following Mathematical Equation (7).

$$y = mx + b \quad (7)$$

where y is the y-axis value of a given dot forming the line, x is the x-axis value of the given dot forming the line, and b is the y-intercept value of the line (i.e., where the line crosses the y-axis). The value of a is equal to the value of m (i.e., a=m).

In the second method (2), the brightness values of each spot 716 are fitted as a sine function using an FFT. FFT techniques are well known in the art, and therefore will not be discussed herein in detail. Any known or to be known FFT process can be used herein without limitation. In some scenarios, the brightness values are used as inputs for a standard FFT algorithm. The ratio of frequency from a flat surface image 722 to a frequency from a curved surface image 720, 724 gives a value of a. In this case, a is defined by the following Mathematical Equation (8).

$$a = \frac{f_0}{f_s} \quad (8)$$

where $f_s$ represents the frequency value computed using the brightness values of each spot contained in a curved surface image 720 or 724, and $f_0$ represents the frequency value computed using the brightness values of each spot contained in a flat surface image 722.

In the case of a 2-d grating (hole mask), curvature radii of both horizontal and vertical directions of samples can be measured simultaneously. But, comparing to a 1-d grating (line mask), the hole grating gives more dimensions of diffraction and fewer fitting points. The spacing of holes and lines in the grating mask has to be carefully chosen based on Mathematical Equations (5), Mathematical Equation (6), and a set up requirement. Larger spacing enables use of a larger mask-to-camera distance Y, while smaller spacing facilitates a more accurate fitting of the image. If Y is set around 30-70 cm and λ is about 500-700 nm, hole/line spacing around 100 microns to 200 microns can be used in some scenarios.

Figure 6:
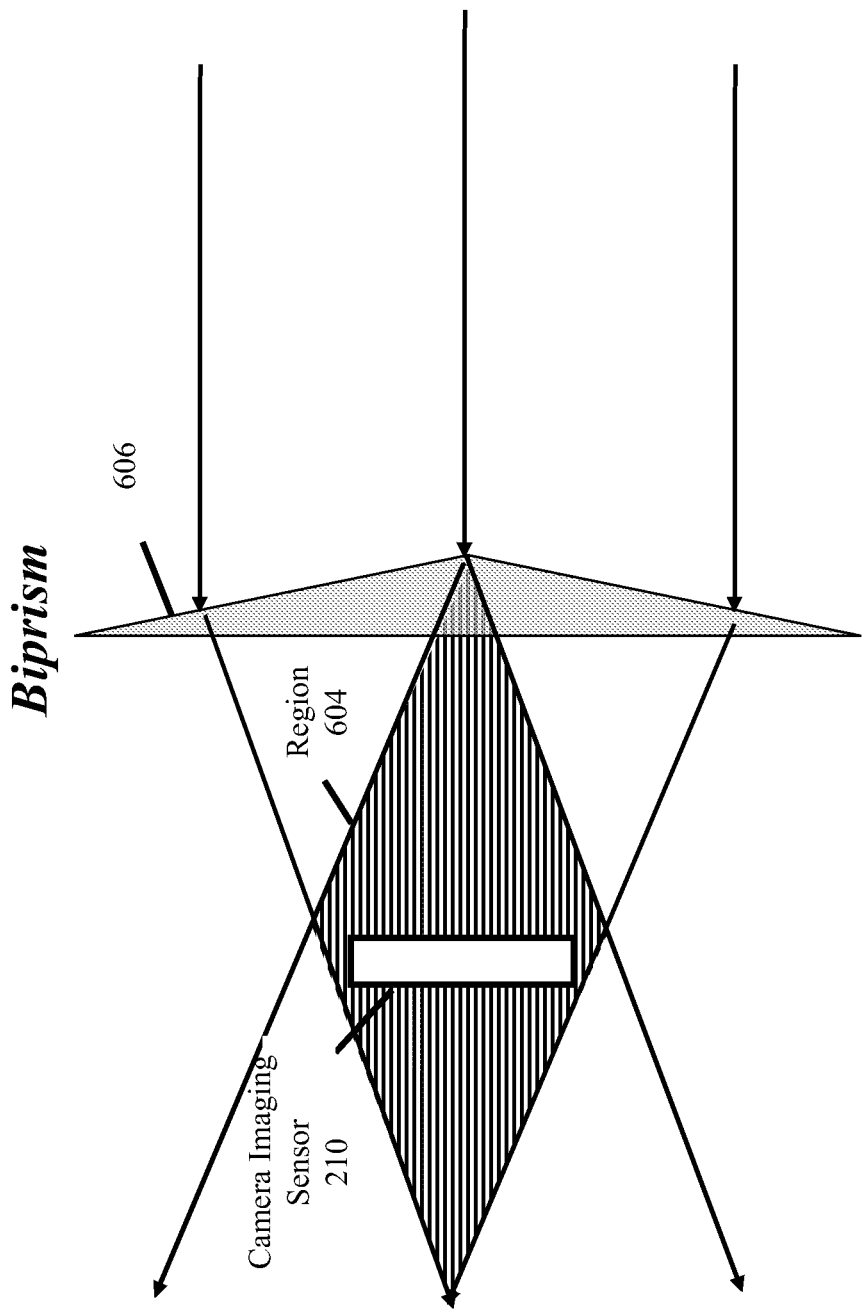
FIG. 6 provides an illustration showing that a mask can be replaced by a biprism (note that an image sensor can be placed anywhere in the area of the shaded region).

In addition, the mask can be replaced by a biprism 606, as shown in FIG. 6. In this case, the interference fringes from laser beams refracted by both sides of the prism form an image as also shown in FIG. 6. The R calculation is the same. The advantage of biprism 606 in comparison to the grating mask 208 is that the CCD camera image sensor 210 can be set anywhere in an area of region 604, instead of periodic fixed positions $Y_n$. Therefore, the biprism 606 based solution does not require position adjustments for different curvatures.

The measurement accuracy of the present solution is substantially enhanced due to the following novel features.

Figure 8:
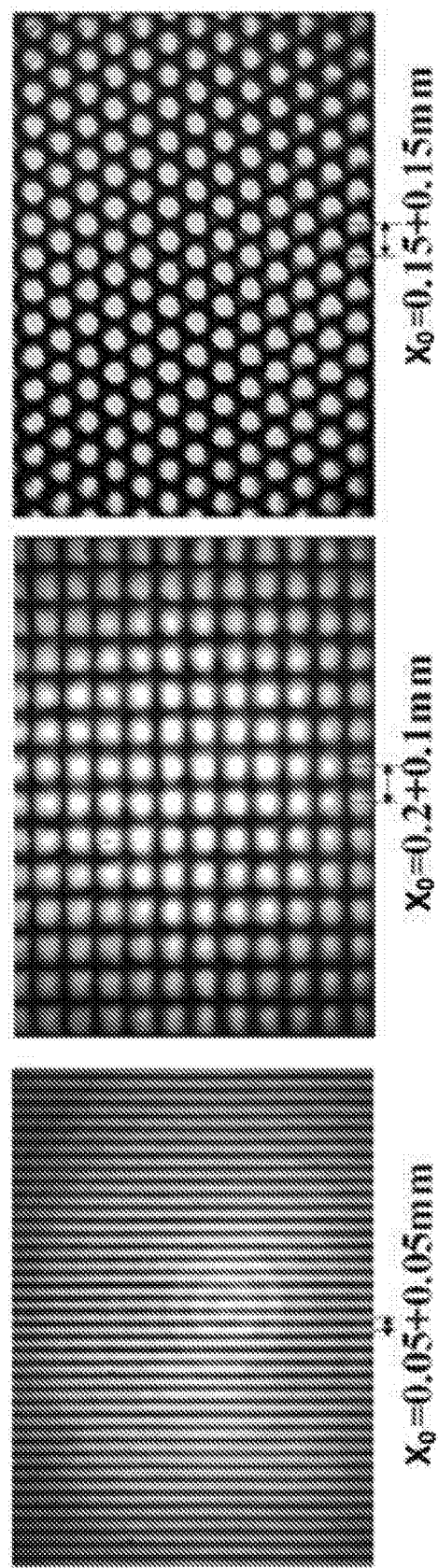
FIG. 8 provides an interference image of a laser beam reflected from a sample surface and diffracted passing through a line, square hole and circular hole masks, respectively.

Making use of diffraction and interference effects of laser beams enables formation of smaller size and larger number of spots in the images which facilitates much more accurate fitting of the images. In commercial product "k-space MOS" (U.S. Pat. No. 7,391,523B1), for example, the laser beams form spots array of 4×3 with spot sizes of 0.8 mm. In the present solution set up with a round hole mask, however, the spots with size of 0.15 mm and array of 15×13 are realized as shown in FIG. 8. Thus, the measurement accuracy is enhanced more than one order of magnitude assuming that all other conditions are the same.

The measurement of a instead of Δx by means of using the flat sample as a reference eliminates the measurement errors caused by x measurement error and unknown initial laser beam divergence.

The novel image fitting methods provide an accuracy improvement. The resolution can be estimated depending on image fitting and camera pixel size. Take a camera of 640×480 pixel resolution with a sensor size of 6 mm×4 mm (9×8 μm pixel size) and Y of 1 m for an example, 9 μm distance could be distinguished by two data points and a fitting can identify less than half of it, resulting in a divergence angle δ measurement accuracy better than $4\times10^{-6}$. Even better measurement accuracy can be easily achieved when using higher resolution camera sensors.

Figure 9:
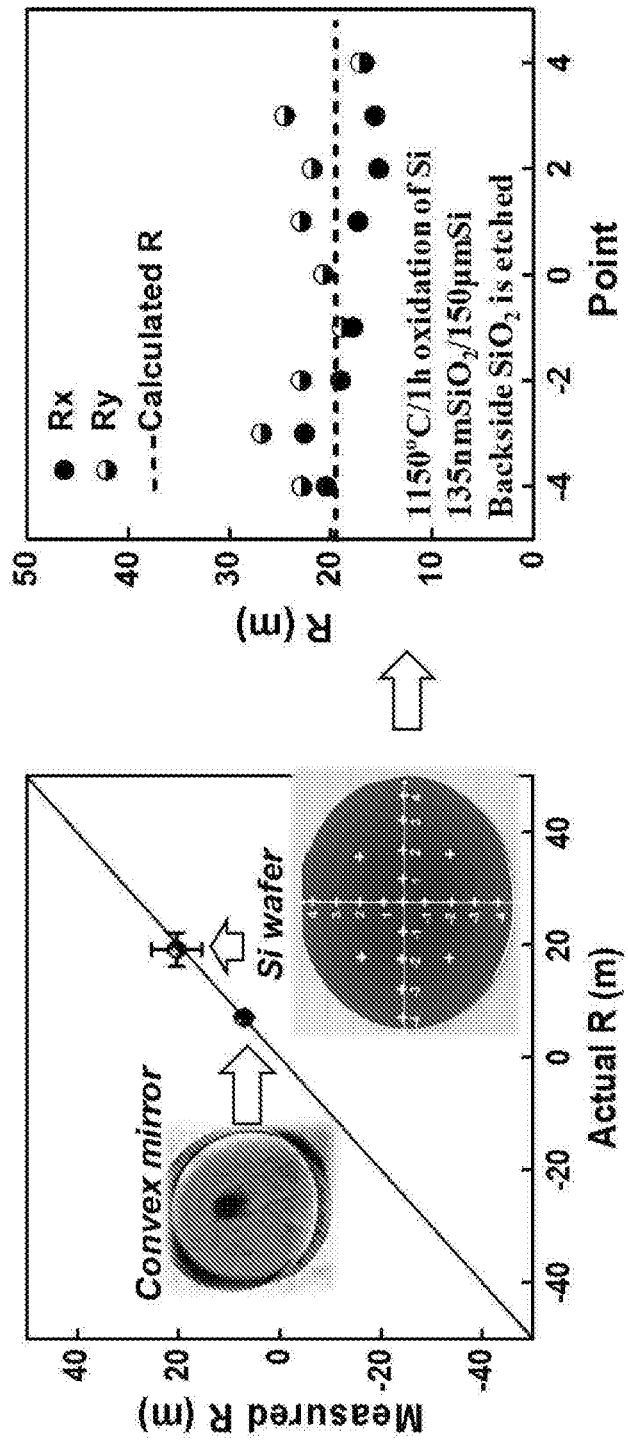
FIG. 9 provides an illustration showing test results of the present solution using a standard convex mirror with a curvature radius of seven point two meters (7.2 m) and an $SiO_2/Si$ sample in which the stress in $SiO_2$ and thickness of $SiO_2$ and Si are known.
Figure 10:
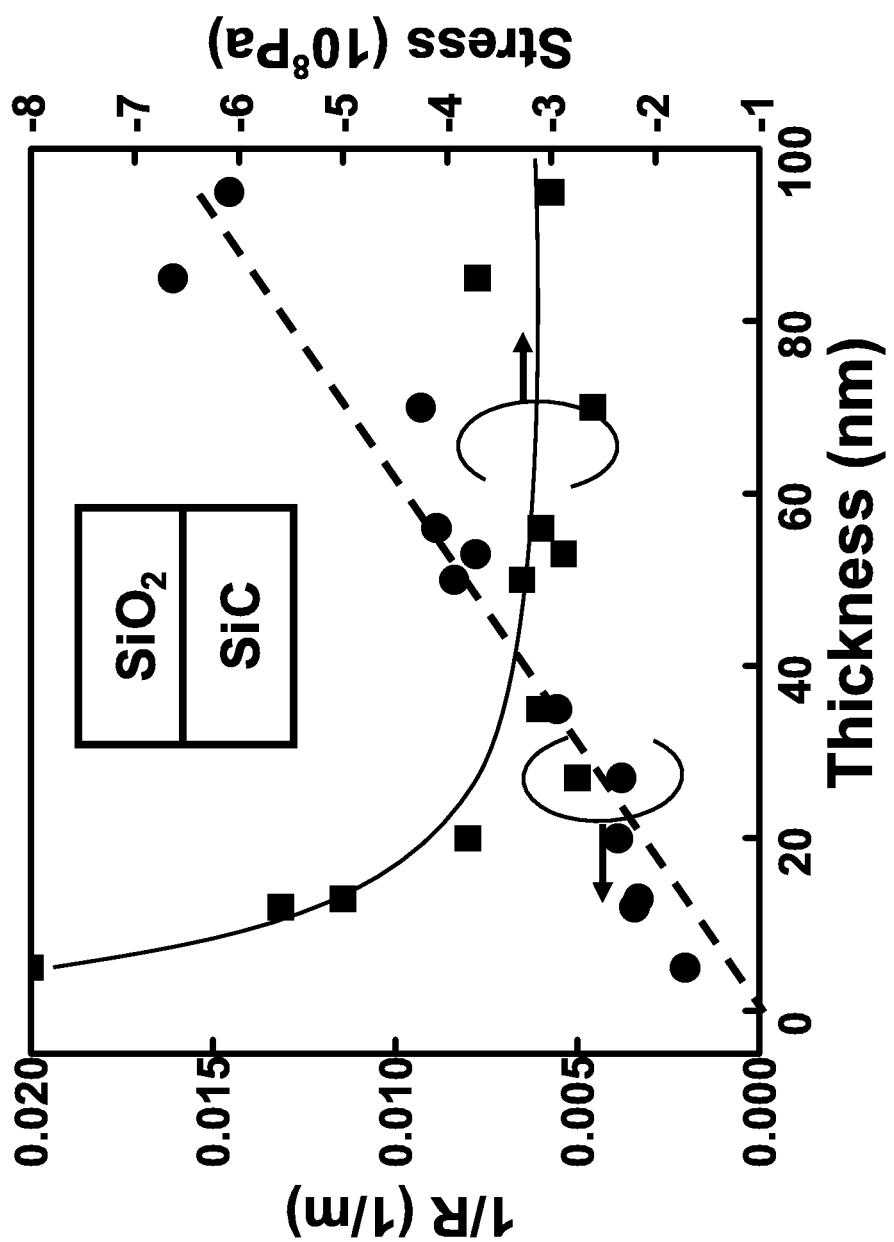
FIG. 10 provides an illustration showing test results of $SiO_2/SiC$ samples with different $SiO_2$ thicknesses $t_f$. For $SiO_2$ films thicker than twenty-five nano-meters (25 nm), R is inverse proportional to $t_f$, resulting in constant stress. For $SiO_2$ film thinner than twenty-five nano-meters (25 nm), film stress increases with decreasing film thickness. These results are as expected theoretically.

The present solution has been tested using a standard convex mirror with a curvature radius of 7.2 m and using a $SiO_2$/Si sample for which the curvature radius is calculated based on known stress in $SiO_2$, and thickness of both $SiO_2$ and Si substrate. The test results are shown in FIG. 9. The results for a $SiO_2$/SiC samples has been also obtained for the first time as shown in FIG. 10. The curvature radii above 100 m in case of ultra-thin films are accurately determined and the resulted stress distribution in $SiO_2$ film is consistent with theoretical expectation.

Placement of a grating mask 208 (or a biprism 606) between the sample 222 and the CCD camera image sensor 210 allows positioning of the sample at substantial distance from the laser source 202 and other optical elements, which enables in-situ measurements when the sample is located inside of a furnace or other sample-processing apparatus. Unlike the present solution, other existing methods use optics to create multiple laser beams before they get reflected from the sample. In this case, the distance between the sample and other optical elements is limited due to fast diffraction spreading of the thin multiple beams, which makes it difficult to do in-situ measurements.

Figure 11:
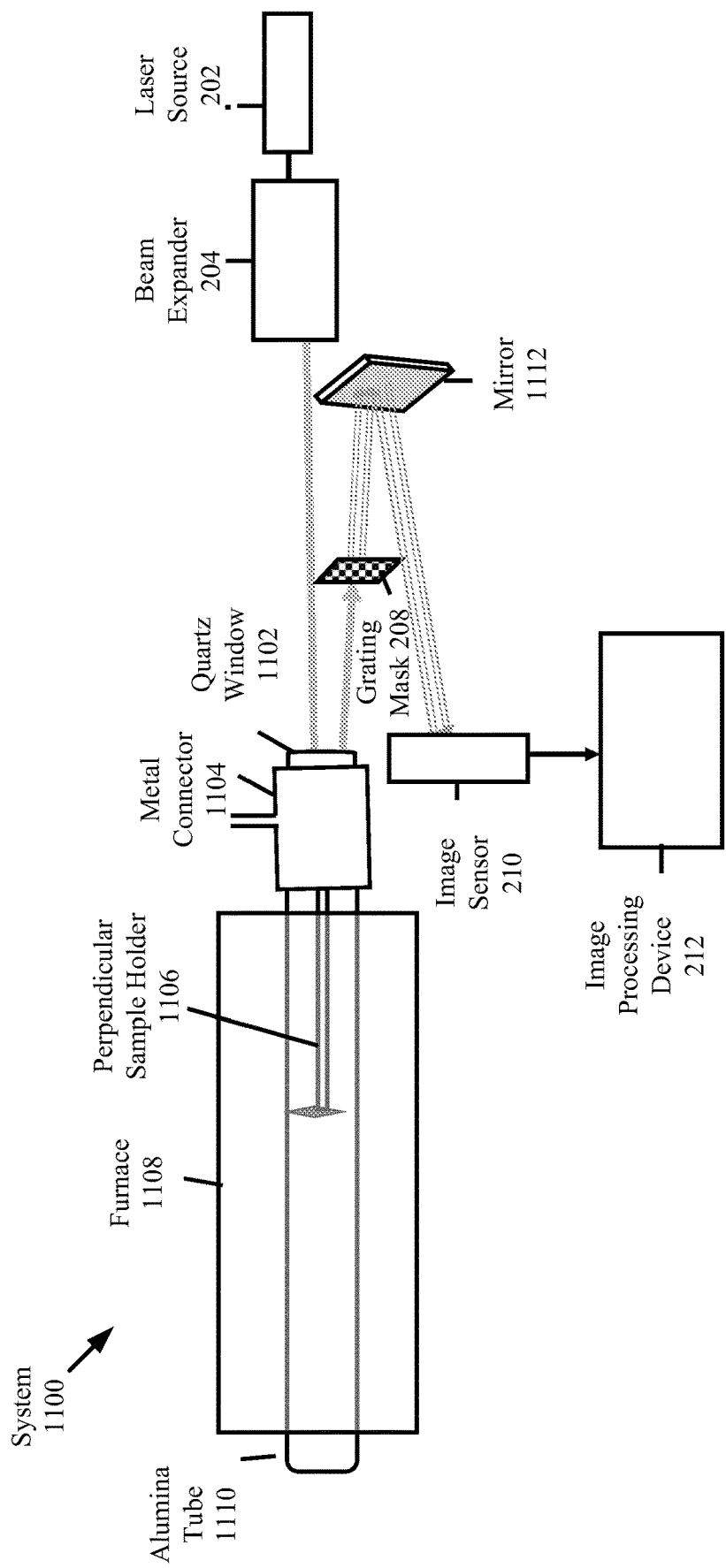
FIG. 11 illustrates a system for an in-situ/real-time measurement during high temperature processing.
Figure 12:
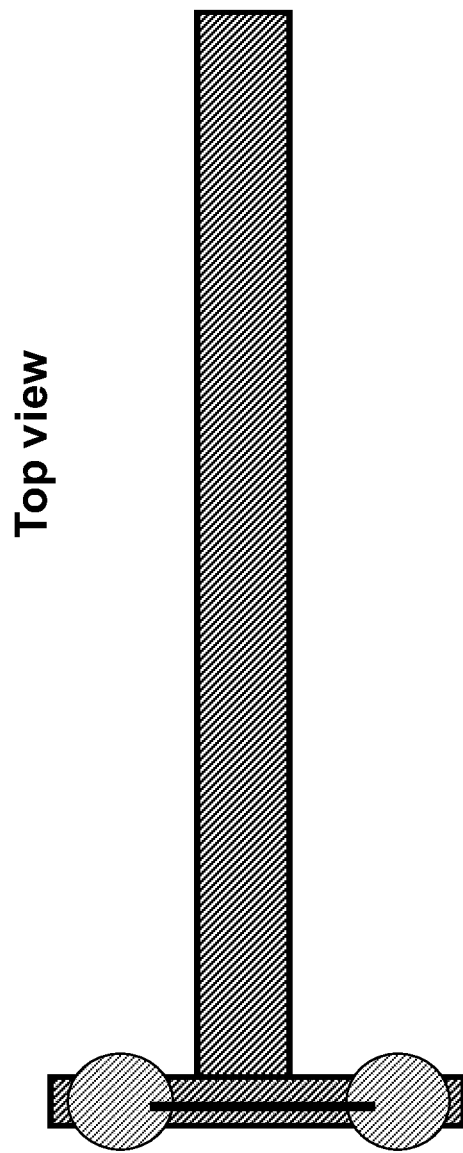
FIG. 12 provides an illustration showing a design of sample holder which can hold a sample perpendicularly.
Figure 12:
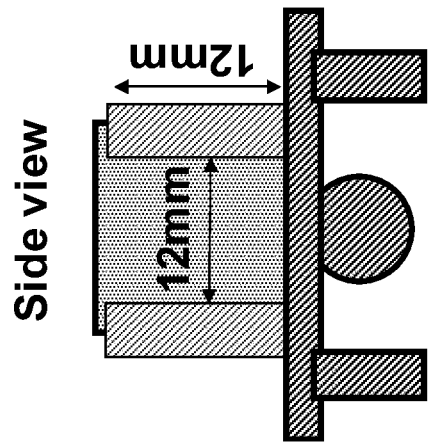
Figure 13:
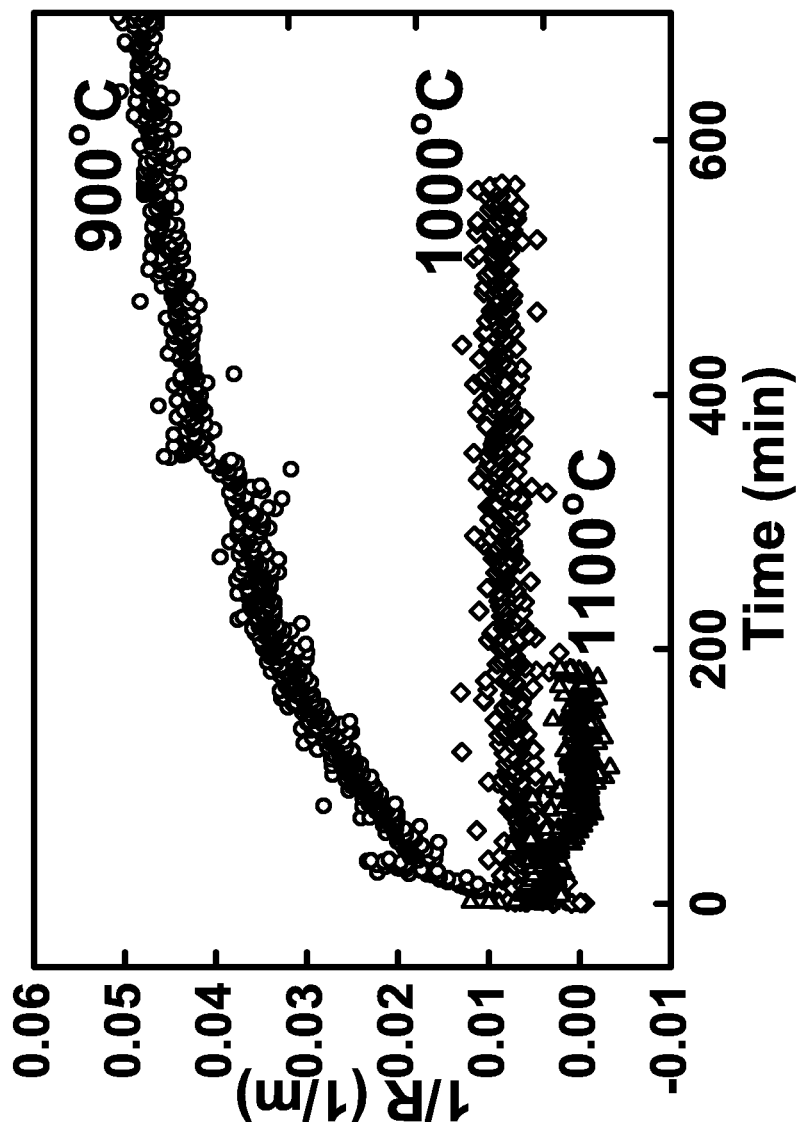
FIG. 13 provides a graph showing test results during silicon oxidation. 900, 1000, 1100° C. growth temperatures are employed. The R change is faster in the initial stage and slower at lower temperature.

An illustration of an illustrative system 1100 architecture implementing the present solution for an in-situ measurement of curvature during high temperature processing is provided in FIG. 11. As shown in FIG. 11, a sample is perpendicularly fixed by a perpendicular sample holder 1106 in an alumina tube 1110 in a furnace 1108. An illustrative architecture for the perpendicular sample holder 1106 is provided in FIG. 12. The expanded laser beam incidents the sample surface with a normal angle θ→0 through a quartz window 1102 which is fixed to the alumina tube 1110 by a metal connector 1104. The reflected laser beam is adjusted to come out from the alumina tube 1110 through the quartz window 1102 and then is diffracted by the grating mask 208. The distance L between grating mask 208 and CCD camera image sensor 210 can be adjusted by a mirror 1112. In FIG. 13, the change of curvature radius of silicon substrate during silicon oxidation at 900, 1000C, 1100° C. under 1 atm $O_2$ flowing has been measured. The results show a smooth change with time at each temperature.

The present solution also enables measuring the thermal expansion of a transparent substrate. The incident laser is reflected from both front and back surfaces of a substrate. The two reflected beams interfere with each other. For ex-situ measurement, via adjusting the incidence angle, the condition for constructive interference is obtained in accordance with Mathematical Equation (9).

$$2t_s = \left(\frac{1}{2} + p\right)\frac{\lambda\cos\theta}{n_s} \qquad (9)$$

where $n_s$ is refractive index of substrate and p is an integer. While during heating/cooling, the thermal expansion changes substrate thickness $t_s$ resulting in periodic constructive and destructive interference. Thermal expansion coefficient α can be calculated in accordance with Mathematical Equation (10).

$$\alpha = \frac{\lambda\cos\theta}{2\Delta T t_s n_s}, \qquad (10)$$

where α is the thermal expansion coefficient and ΔT is the temperature difference between two constructive interferences.

The functions and resolution of system 200 compared to that of the best for commercial are summarized in the following TABLE 1. The present solution not only achieves the curvature measurement of smaller samples by a much simpler design, improves the measurement sensitivity but also adds a thermal expansion measurement function.

TABLE 1

|  | Resolution (δ) | Sample size (mm × mm) | Heating/ cooling (° C.) | Thermal expansion measurement |
| --- | --- | --- | --- | --- |
| Present Solution | $<4 \times 10^{-6}$ | 5 × 5 | 1600 | Yes |
| Best for commercial | $2 \times 10^{-5}$ | 8.8 × 6.6 | 500 | No |

Referring now to FIG. 2B, there is provided a detailed block diagram of an illustrative architecture for the image processing device 212 of FIG. 2A. Image processing device 212 may include more or less components than those shown in FIG. 2B. However, the components shown are sufficient to disclose an illustrative embodiment implementing the present solution. The hardware architecture of FIG. 2B represents one embodiment of a representative computing device configured to facilitate an improved method for the measurement of stress and curvature of a sample. As such, the image processing device 212 of FIG. 2B implements at least a portion of a method for the measurement of stress and curvature in accordance with the present solution.

Some or all the components of the image processing device 212 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2B, the image processing device 212 comprises a user interface 252, a Central Processing Unit ("CPU") 256, a system bus 254, a memory 258 connected to and accessible by other portions of the image processing device 212 through system bus 254, and hardware entities 268 connected to system bus 254. The user interface can include input devices (e.g., a keypad 260) and output devices (e.g., speaker 262, a display 264, and/or light emitting diodes 266), which facilitate user-software interactions for controlling operations of the image processing device 212.

At least some of the hardware entities 268 perform actions involving access to and use of memory 258, which can be a RAM, a disk drive and/or a Compact Disc Read Only Memory ("CD-ROM"). Hardware entities 268 can include a disk drive unit 276 comprising a computer-readable storage medium 278 on which is stored one or more sets of instructions 270 (e.g., software code) configured to implement one or more of the methodologies, procedures, or functions described herein. The instructions 270 can also reside, completely or at least partially, within the memory 258 and/or within the CPU 256 during execution thereof by the image processing device 212. The memory 258 and the CPU 256 also can constitute machine-readable media. The term "machine-readable media", as used here, refers to a single medium or multiple media (e.g., a centralized or distributed database, and/or associated caches and servers) that store the one or more sets of instructions 270. The term "machine-readable media", as used here, also refers to any medium that is capable of storing, encoding or carrying a set of instructions 270 for execution by the image processing device 212 and that cause the image processing device 212 to perform any one or more of the methodologies of the present disclosure.

In some scenarios, the hardware entities 268 include an electronic circuit (e.g., a processor) programmed for facilitating for the measurement of stress and curvature in accordance with the present solution. In this regard, it should be understood that the electronic circuit can access and run an image processing application 272 installed on the image processing device 212. The software application 272 is generally operative to: derive a stress and a sample surface curvature from images formed by means of interference of laser beams diffracted by a grating mask; derive said stress and a sample surface curvature from images formed by means of interference of laser beams refracted by a biprism; determine position changes of bright spots or lines shown in the images; calculate the sample surface curvature using the determined position changes; determine spatial frequency changes of the bright spots or lines shown in the images; and/or calculate the sample surface curvature using the determined spatial frequency changes. Other functions of the software application 272 are apparent from the above discussion.

Figure 14:
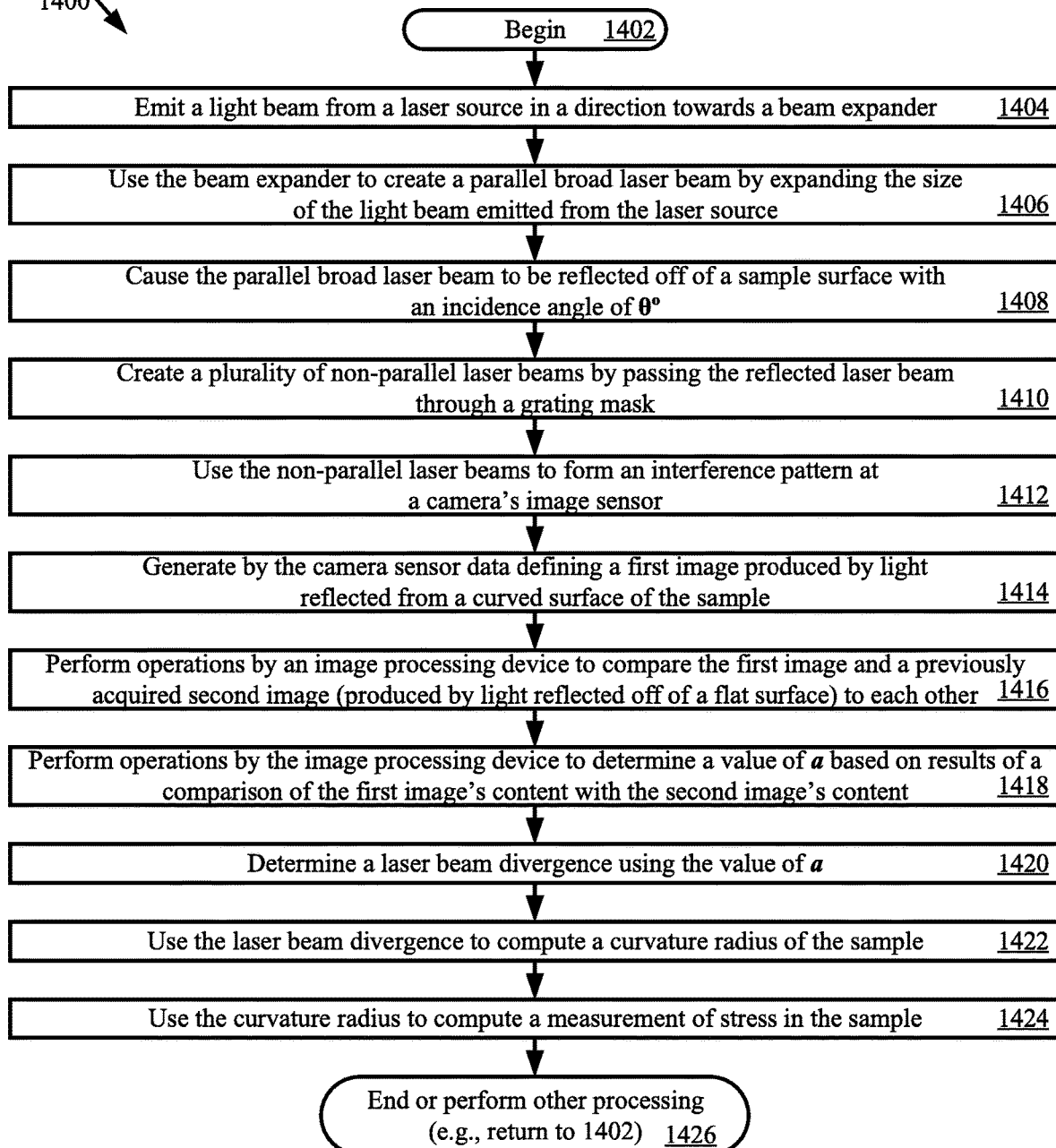
FIG. 14 is a flow diagram of an illustrative method for the measurement of stress and curvature of a sample.

Referring now to FIG. 14, there is provided a flow diagram of an illustrative method 1400 for the measurement of stress and curvature of a sample (e.g., sample 222 of FIG. 2A). Method 1400 begins with 1402 and continues with 1404 where a light beam (e.g., light beam 224 of FIG. 2A) is emitted from a laser source (e.g., laser source 202 of FIG. 2A) in a direction towards a beam expander (e.g., a beam expander 204 of FIG. 2A). In 1406, the beam expander creates a parallel broad laser beam (e.g., laser beam 226 of FIG. 2) by expanding the size of the light beam emitted from the laser source. The parallel broad laser beam is reflected off of a sample surface with an incidence angle of θ°, as shown by 1408. Next in 1410, a plurality of non-parallel laser beams (e.g., non-parallel laser beams 214 of FIG. 2A) are created by passing the reflected laser beam (e.g., reflected laser beam 228 of FIG. 2A) through a grating mask (e.g., grating mask 208 of FIG. 2A). The non-parallel laser beams are used in 1412 to form an interference pattern at a camera's image sensor (e.g., CCD camera image sensor 210 of FIG. 2A). The camera generates sense data in 1414. The sense data includes sense data for a first image (e.g., image 304 of FIG. 3) produced by light reflected from a curved surface. The sense data is communicated from the camera to an image processing device (e.g., image processing device 212 of FIG. 2A).

In 1416-1418, the image processing device performs operations to determine a value of a based on results of a comparison of the first image to a previously acquired second image (e.g., image 302 of FIG. 3) produced by light reflected from a flat surface. The manner in which the value of a is determined is described above in relation to FIG. 7.

In general, the value of a is determined by: extracting a first center position (e.g., center position 704 of FIG. 7) for each bright feature (e.g., spot 702 of FIG. 7) contained in the first image (e.g., image 700 or 708 of FIG. 7) and a second center position for each bright feature contained in the second image (e.g., image 706 of FIG. 7); plotting dots (e.g., dot 714 of FIG. 7) on a two dimensional graph (e.g., graph 710 of FIG. 7) for each said first center position respectively as a function of each said second center position; determining a slope of a linear line defined by the dots; and setting the value of a to the value of the sloe. Alternatively, the value of a is determined by: determining a first frequency (e.g., frequency $f_0$ of FIG. 7) of a sinusoidal signal (e.g., sinusoidal signal 732 of FIG. 7) generated using brightness values of bright features (e.g., spots 716 of FIG. 7) contained in the first image (e.g., image 722 of FIG. 7); determining a ratio of the first frequency to a second frequency (e.g., frequency $f_s$ of FIG. 7) of a sinusoidal signal (e.g., sinusoidal signal 730 or 734 of FIG. 7) generated using brightness values of bright features contained in the second image (e.g., image 720 or 724 of FIG. 7); and setting the value of a to the value of the ratio.

The value of a is used in 1420 to determine a laser beam divergence value a−1. The laser beam divergence value is used in 1422 to compute a curvature radius of the sample. This computation is performed in accordance with the above provided Mathematical Equation (4). In 1424, the curvature radius is used to compute a measurement of stress in the sample. Mathematical Equation (1) can be used in 1424. Subsequently, 1426 is performed where method 1400 ends or other processing is performed (e.g., return to 1402).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for measuring a curvature radius of a sample, comprising:
   emitting a light beam from a laser source in a direction towards a beam expander;
   expanding a size of the light beam emitted from the laser source to create a broad laser beam;
   reflecting the broad laser beam off of a curved surface of the sample;
   creating a plurality of non-parallel laser beams by passing the reflected broad laser beam through a grating mask or a biprism;
   using the plurality of non-parallel laser beams to create an interference pattern at a camera image sensor;
   capturing a first image and a second image by the camera image sensor, contents of the second image produced by light reflected off of a flat surface or a curved surface;

processing the first and second images by an image processing device to determine a value a;

using the value a to determine a laser beam divergence value; and using the laser beam divergence value to compute the curvature radius of the sample.

2. The method according to claim 1, wherein the value of a is determined based on positions of bright features contained in the first image and the second image.

3. The method of claim 2, wherein the value a is determined by:

extracting a first center position for each bright feature contained in the first image and a second center position for each bright feature contained in the second image;

plotting points on a two dimensional graph for each said first center position respectively as a function of each said second center position;

determining a slope of a linear line defined by the points.

4. The method according to claim 1, wherein the value of a is determined based on spatial frequency changes of bright features contained in the first image and the second image.

5. The method according to claim 4, wherein the value a is determined by:

determining a first frequency of a sinusoidal signal generated using brightness values of the bright features contained in the first image;

determining a ratio of the first frequency to a second frequency of a sinusoidal signal generated using brightness values of the bright features contained in the second image.

6. The method according to claim 1, wherein the grating mask comprises periodic holes.

7. The method according to claim 1, wherein the grating mask comprises periodic lines.

8. The method according to claim 1, wherein the sample is located inside of a high-temperature furnace.

9. The method according to claim 1, further comprising using the curvature radius to compute a measurement of stress in the sample.

10. The method according to claim 1, further comprising using the laser beam divergence value to compute a stress related curvature radius of the sample and compute a measurement of stress in the sample.

11. A system, comprising:

a light source configured to emit a light beam;

a beam expander configured to expand a size of the light beam emitted from the laser source to create a broad laser beam;

a sample with a curved surface off of which the broad laser beam is reflected;

a grating mask or a biprism configured to create a plurality of non-parallel laser beams from the reflected broad laser beam;

a camera image sensor at which an interference pattern is created by the plurality of non-parallel laser beams, and which is configured to capture a first image and a second image with content produced by light reflected off of a flat or curved surface; and an image processing device comprising a processor, and a non-transitory computer-readable storage medium comprising programming instructions that are configured to cause the processor to implement a method for measuring a curvature radius of a sample, wherein the programming instructions comprise instructions to (i) process the first and images to determine a value a, (ii) use the value a to determine a laser beam divergence value, and (iii) use the laser beam divergence value to compute the curvature radius of the sample.

12. The system according to claim 11, wherein the value of a is determined based on positions of bright features contained in the first image and the second image.

13. The system of claim 12, wherein the value a is determined by:

extracting a first center position for each bright feature contained in the first image and a second center position for each bright feature contained in the second image;

plotting points on a two dimensional graph for each said first center position respectively as a function of each said second center position;

determining a slope of a linear line defined by the points.

14. The system according to claim 11, wherein the value of a is determined based on spatial frequency changes of bright features contained in the first image and the second image.

15. The system according to claim 14, wherein the value a is determined by:

determining a first frequency of a sinusoidal signal generated using brightness values of the bright features contained in the first image;

determining a ratio of the first frequency to a second frequency of a sinusoidal signal generated using brightness values of the bright features contained in the second image.

16. The system according to claim 11, wherein the grating mask comprises periodic holes.

17. The system according to claim 11, wherein the grating mask comprises periodic lines.

18. The system according to claim 11, wherein the sample is located inside of a high-temperature furnace.

19. The system according to claim 11, wherein the further comprise the programming instructions comprise instructions to compute a measurement of stress in the sample using the curvature radius.

20. The system according to claim 11, further comprising using the laser beam divergence value to compute a stress related curvature radius of the sample and compute a measurement of stress in the sample.

* * * * *